(12) United States Patent
Ceglarek et al.

(10) Patent No.: US 11,712,988 B2
(45) Date of Patent: Aug. 1, 2023

(54) VEHICLE SEAT

(71) Applicant: Faurecia Autositze GmbH, Stadthagen (DE)

(72) Inventors: Piotr Ceglarek, Katowice (PL); Robert Grzeslo, Swidnica (PL); Tomasz Stasinski, Dzierzoniow (PL)

(73) Assignee: Faurecia Autositze GmbH, Stadthagen (DE)

( * ) Notice: Subject to any disclaimer, the term of this patent is extended or adjusted under 35 U.S.C. 154(b) by 151 days.

(21) Appl. No.: 17/226,139

(22) Filed: Apr. 9, 2021

(65) Prior Publication Data

US 2021/0323456 A1 Oct. 21, 2021

(30) Foreign Application Priority Data

Apr. 16, 2020 (DE) .......................... 102020110439.1
Mar. 17, 2021 (DE) .......................... 102021106561.5

(51) Int. Cl.
  *B60N 2/90* (2018.01)
  *A47C 27/08* (2006.01)
  *A47C 4/54* (2006.01)

(52) U.S. Cl.
  CPC .............. *B60N 2/914* (2018.02); *B60N 2/99* (2018.02); *A47C 4/54* (2013.01); *A47C 27/081* (2013.01)

(58) Field of Classification Search
  CPC ........ B60N 2/99; B60N 2/914; A47C 27/081; A47C 4/54
  See application file for complete search history.

(56) References Cited

U.S. PATENT DOCUMENTS

| 9,963,054 | B2* | 5/2018 | Tanaka | B60N 2/99 |
| 10,286,811 | B2* | 5/2019 | Beuschel | B60N 2/42763 |
| 10,518,683 | B2* | 12/2019 | Kojima | B60N 2/99 |
| 11,541,798 | B2* | 1/2023 | Ceglarek | B60N 2/914 |
| 2008/0271251 | A1* | 11/2008 | Kerekes | A47C 27/081 5/655.3 |
| 2010/0117412 | A1* | 5/2010 | Bicker | B60N 2/99 297/284.6 |
| 2012/0187736 | A1* | 7/2012 | Stroeher | B60N 2/5621 297/452.41 |
| 2018/0370397 | A1* | 12/2018 | Rist | B60N 2/0276 |

FOREIGN PATENT DOCUMENTS

DE  102020103243 A1 * 8/2021 ............. B60N 2/914

* cited by examiner

*Primary Examiner* — Syed A Islam
(74) *Attorney, Agent, or Firm* — Laurence P. Colton; Smith Tempel Blaha LLC

(57) ABSTRACT

A vehicle seat having a backrest and a seat part, as well as at least one sidewall arranged on the backrest or on the seat part, the sidewall having two support portions that are coupled together, by a coupling means, and are movable relative to one another, between which support portions at least one hollow body that can be filled with fluid is arranged, the relative position of the two support portions with respect to one another, and thus the outside contour of the sidewall, being variable by filling or emptying the at least one hollow body. The coupling means is designed such that, upon filling or emptying of the at least one hollow body, the two support portions are variable relative to one another, both in translation and in their angular position.

8 Claims, 7 Drawing Sheets

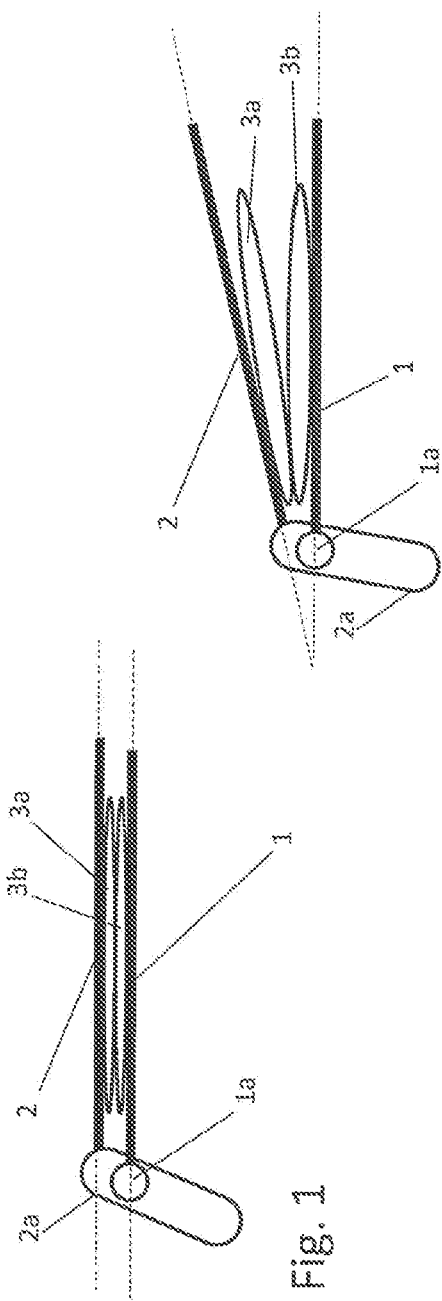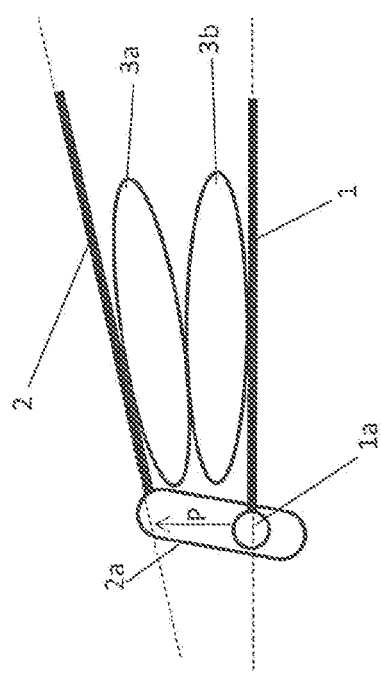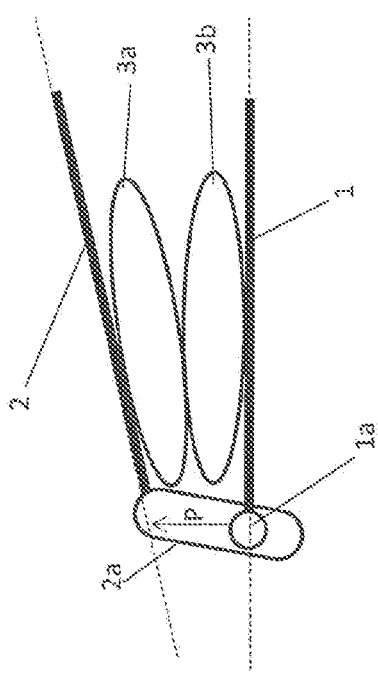

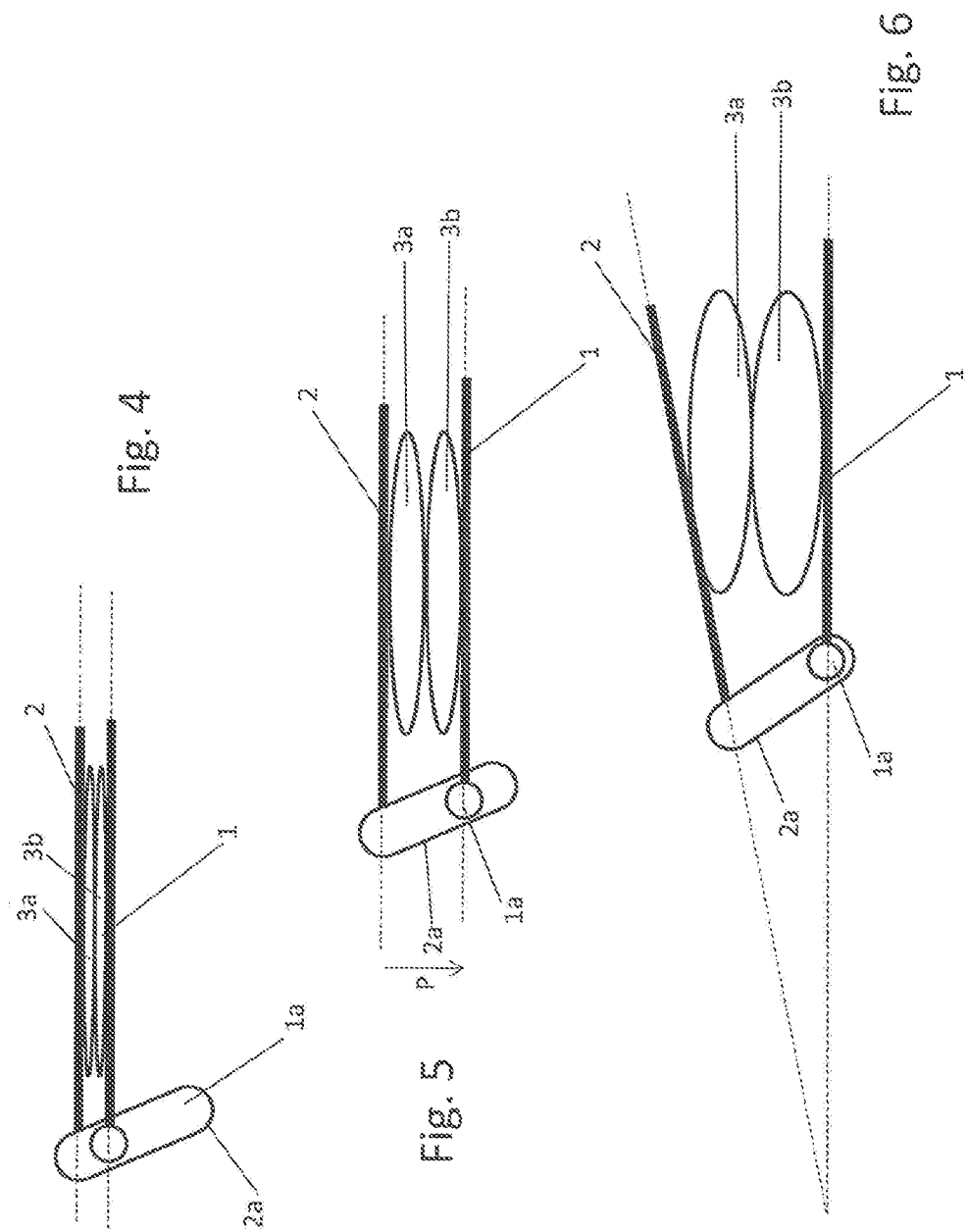

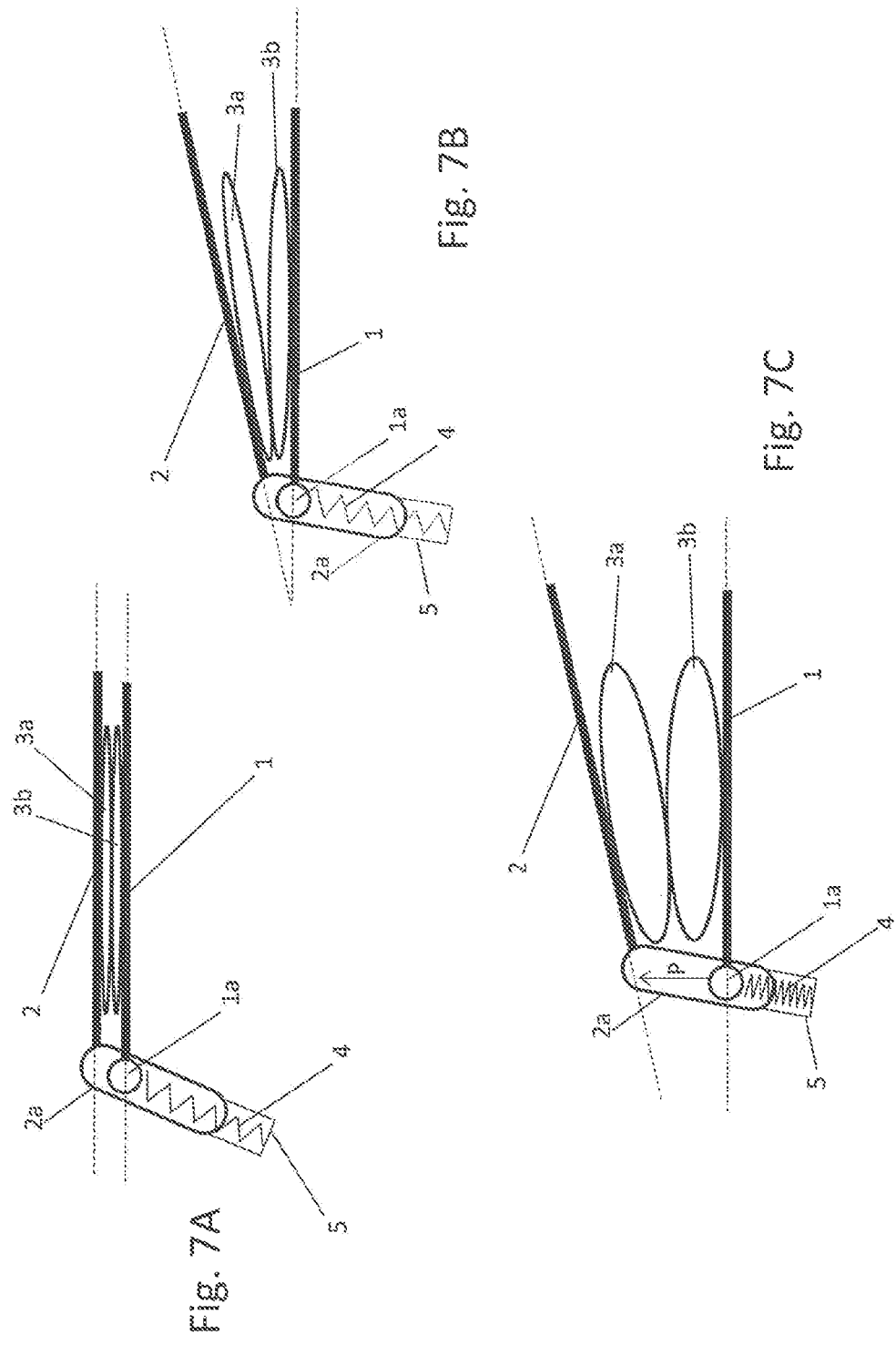

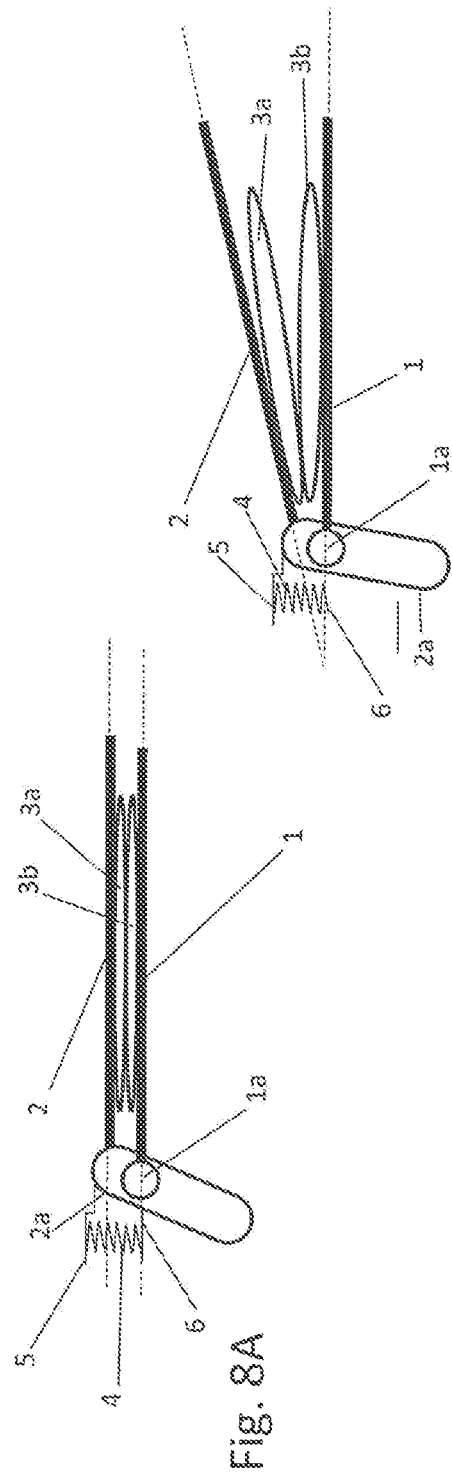
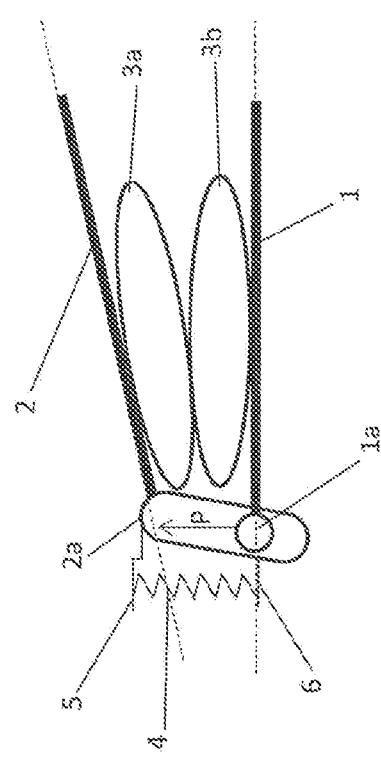

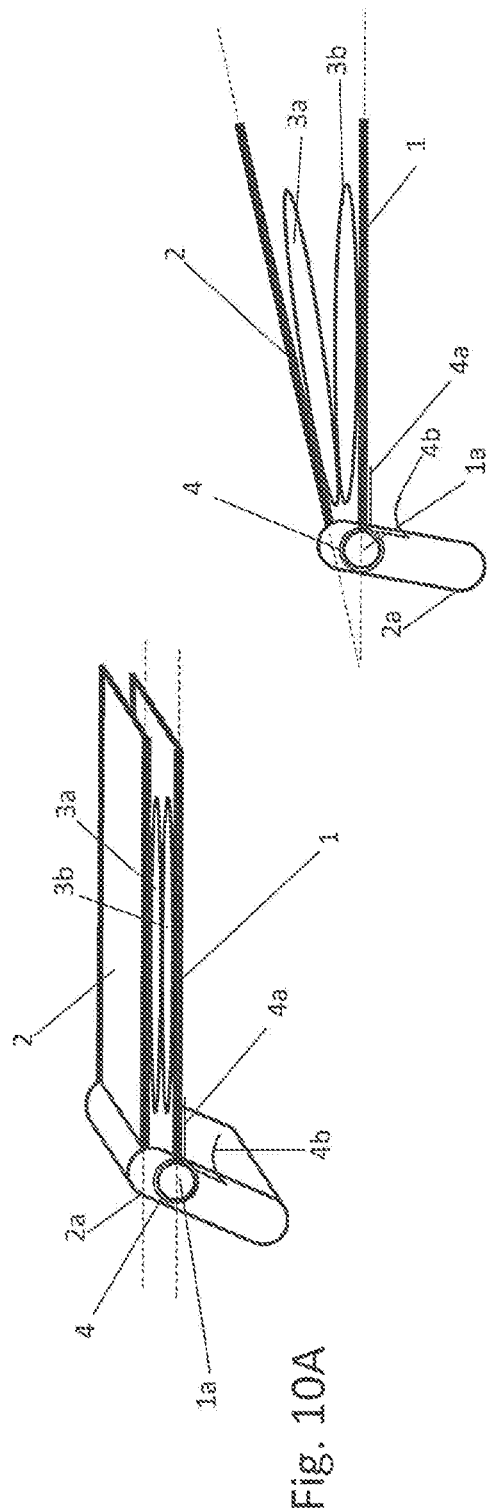
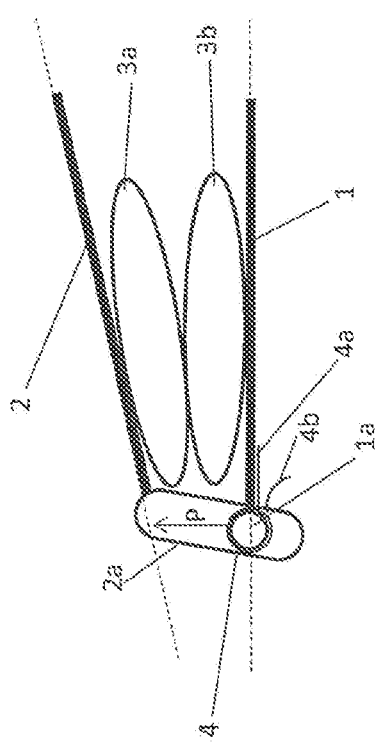
Fig. 10A
Fig. 10B
Fig. 10C

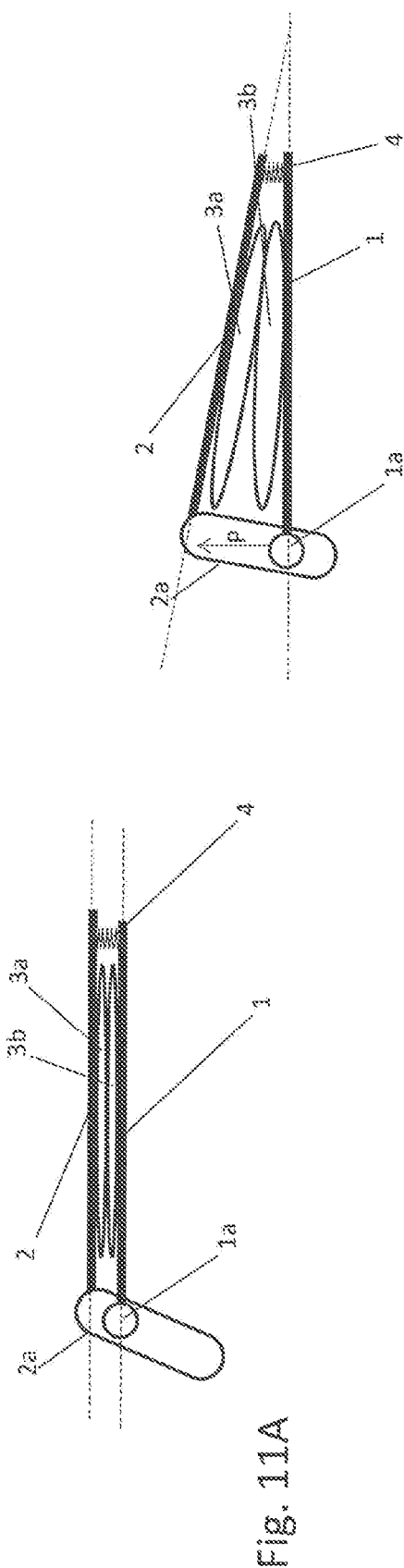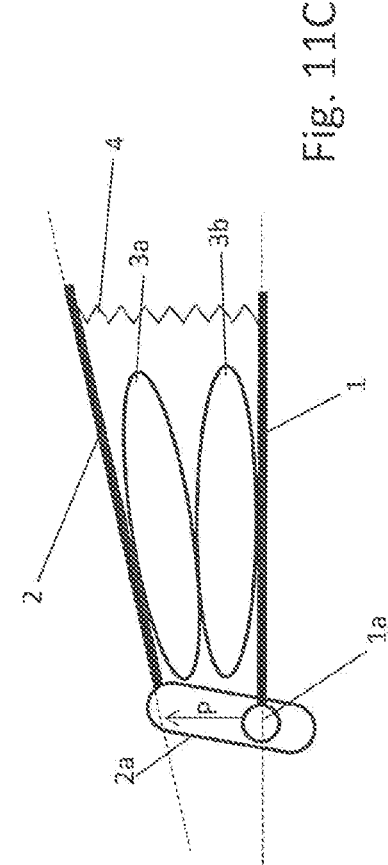

VEHICLE SEAT

CROSS REFERENCE TO RELATED APPLICATIONS

This patent application claims the benefit of and priority on German Patent Application No. DE 10 2020 110 439.1 having a filing date of 16 Apr. 2020 and German Patent Application No. DE 10 2021 106 561.5 having a filing date of 17 Mar. 2021.

BACKGROUND OF THE INVENTION

Technical Field

The invention relates to a vehicle seat comprising a backrest and a seat part, as well as at least one sidewall arranged on the backrest or on the seat part, the sidewall comprising two support portions that are coupled together, by a coupling means, and are movable relative to one another, between which support portions at least one hollow body that can be filled with fluid is arranged, the relative position of the two support portions with respect to one another, and thus the outside contour of the sidewall, being variable by filling or emptying the at least one hollow body.

Prior Art

Vehicle seats generally comprise sidewalls which are arranged either on the backrest or on the seat part. An example for this is described in US 2008 0271251 A1. In some vehicle seats, said sidewalls are adjustable. For this purpose, in the past the possibility of changing the contour of the sidewall by filling pneumatic structures has gained acceptance. In the known sidewalls, a pneumatically actuated balloon, i.e., an externally flexible structure, is arranged between two support plates that are interconnected via a swivel pin. The outside contour of said wedge-shaped structure can be changed in that the balloon is filled or emptied. As a result, the angle between the two support plates changes.

Vehicle seats, in particular the motor vehicle seats primarily dealt with here, must, however, be suitable for a large number of people having very different anatomical requirements. Both large people and small people, and of course those having a rather wider and rather slender stature, should be able to sit as comfortably as possible in a vehicle seat.

The above-described adjustment of the sidewall is, however, not suitable in the same way for all the above-described anatomical situations. In other words, the contour change may generate a supporting effect, to the side, in the case of a rather wider person, while a rather slender person may feel no noticeable change, and in some circumstances no supporting effect at all, even when passing through the entire adjustment range of the sidewall.

BRIEF SUMMARY OF THE INVENTION

The object of the present invention is therefore that of developing a vehicle seat of the type mentioned at the outset in that the sidewall can be better adjusted to different anatomical situations.

This object is achieved by a vehicle seat having a backrest and a seat part, as well as at least one sidewall arranged on the backrest or on the seat part, the sidewall comprising two support portions that are coupled together, by a coupling means, and are movable relative to one another, between which support portions at least one hollow body that can be filled with fluid is arranged, the relative position of the two support portions with respect to one another, and thus the outside contour of the sidewall, being variable by filling or emptying the at least one hollow body, characterized in that the coupling means is designed such that, upon filling or emptying of the at least one hollow body, the two support portions are variable relative to one another, both in translation and in their angular position. Advantageous embodiments can be found in the dependent claims.

The vehicle seat according to the invention comprises a backrest and a seat part, as well as at least one sidewall arranged on the backrest or on the seat part. In this case, the sidewall comprises two support portions that are coupled together via a coupling means and are movable relative to one another, between which support portions at least one hollow body which can be filled with a fluid is arranged. The relative position of the two support portions with respect to one another, and thus the outer contour of the sidewall, can be changed by filling or emptying the at least one hollow body. It is now provided, according to the invention, for the coupling means to be designed such that, in the case of filling or emptying the at least one hollow body, the two support portions are variable with respect to one another both in translation and in their angular position relative to one another. This does not specify any clear sequence, and it can likewise be provided that translational and rotatory movements can be carried out in succession or simultaneously. In this case, it is possible for first a translational and then a rotatory movement to be carried out. Said movement sequences can likewise take place in the reverse sequence.

In this way, the outside contour of the sidewall is changed not only with respect to the angle of attack of the two support portions, i.e., not only the opening angle of a wedge is changed, but the outside contour can also be changed by means of translational shifting of the two support portions relative to one another. This makes it possible to achieve outside contours which deviate significantly from the wedge shape known in the prior art. It is thus in particular also possible to grant the adjustment of the sidewall a greater depth, such that the lateral support is ensured even in the case of more slender persons. It is self-evident that the vehicle seat according to the invention can of course also comprise more than one sidewall. Said sidewalls can be designed such that they can be changed in a manner adjusted to one another. For example, it is possible to adjust the sidewalls separately from one another. According to another embodiment, a plurality of sidewalls can also be adjusted simultaneously; for example, two sidewalls provided on opposite sides of the vehicle seat can be adjusted simultaneously.

According to a preferred embodiment of the present invention, the support portions comprise plate-like contact portions, on which the at least one hollow body is supported. Portions of this kind can be accommodated in the sidewall in a particularly installation-space-saving manner, in particular under the associated cushioning and the associated covering.

At this point it should be noted that the term "plate-like" is not restricted to a flat sheet material. It can also be other surfaces which are for example curved or bent in another manner. In the following, a plate is to be understood as general sheet materials which have a comparatively low thickness in comparison with the lateral extension thereof in parallel with the surface.

A return means is preferably active between the two support portions, which return means is tensioned upon filling of the at least one hollow body. According to a preferred embodiment, the return means is designed as a compression spring, tension spring or torsion spring. As a result of tensioning the return means during the filling process, upon emptying the hollow body the device returns to the starting position again. In addition, it is also possible to control the behavior of the device according to the invention, using a return means of this kind. It is thus possible, for example, to ensure that firstly a rotation of the two support portions, relative to one another, occurs, before a translational displacement, in particular shift, of the two support portions, relative to one another, takes place.

Preferably a guide portion is arranged at a first support portion, and a portion guided by the guide portion is arranged at another, second support portion. As a result of this, upon inflating the hollow body (the hollow body can be filled for example with air, but also with another fluid medium), forced guidance of the movement of the two support portions relative to one another takes place. This ensures that the sidewall is adjusted not merely at random, but rather within a determined movement range. In this case, it is in particular possible for the guided portion to comprise a guide pin or a guide rod, and for the guide portion to comprise a guide groove or a guide link or a guide receptacle, on or in which the guided portion is received. The guide portion can comprise a linear guide. Of course, it is also possible to provide for example an arcuate or otherwise curved guide and/or a guide deviating from a linear course, instead of or in addition to a linear guide, depending on what movement path or movement range is desired. Which of the two support portions the guide portion is now arranged on, and which the guided portion is arranged on, is irrelevant for the implementation of the invention. Both variants are equally conceivable.

Depending on the arrangement of the above-described guide portions, the return means according to the invention can also be positioned correspondingly. According to one embodiment, it may be possible for the return means, in particular as a compression spring, to be arranged between a first coupled portion attached to the guide portion, and the guided portion. In an alternative hereto, the return means, in particular as a tension spring, can be arranged between the first coupling portion attached to the guide portion, and a second coupling portion attached to the guided portion. If "arranged between" is mentioned in the above, in this case it is in particular also possible for fastening of the return means to both portions, between which they are arranged, to be provided.

As an alternative thereto, the return means can be designed in the form of a tension spring, which is arranged in a region remote from the guide portion and the guided portion, preferably on an end region opposite the guide portion and the guided portion, between the first support portion and the second support portion. As a result of this embodiment, firstly a mutual rotational movement of the two support portions remote from the guide portion or guided portion is carried out. Thus, first of all the guided portion and the guide portion are shifted, and subsequently, under spreading of the tension spring, a translational movement of the two support regions relative to one another, together with a simultaneous pivot movement, takes place.

According to a further alternative of the vehicle seat according to the invention, it may be possible for the return means to be a torsion spring in the form of a leg spring comprising a first leg and a second leg, which spring is preferably guided around the guided portion. In this case, according to a first variant the first leg can rest on the second support portion, on the side remote from the hollow body that can be filled with fluid, and the second leg can be supported on the first support portion, on the side remote from the hollow body that can be filled with fluid. In a further variant, the second leg can also be supported on the guide portion.

The hollow body or bodies that can be filled with fluid is/are preferably pneumatically actuated balloon(s). Such balloons have a flexible outside contour which adapts particularly well to the support portions, such that optimal force transmission to the support portions, and thus an optimal adjustment thereof relative to one another, is possible.

According to a preferred embodiment of the present invention, the first or the second support portion is arranged in a stationary manner with respect to the motor vehicle seat. This can for example be rigidly connected, or at least connected in a manner immovable in location, to the structure of the backrest or of the seat part. The relative movement between the two support portions then takes place merely in that the lower support portion is moved by filling or emptying the hollow body or bodies. In other words, one of the support portions can be an actual part of the seat structure; it does not need to be formed as a separate component.

In general, it is possible for a return means to be active between the two support portions. Such a return means can for example be a return spring or be implemented by resilient cushioning, for example a foam material or the like, itself. The return means builds up a tension between the two support portions, upon filling of the hollow body, which tension ensures that the support portions can be moved back into a starting position upon emptying of the hollow body.

According to a preferred embodiment of the present invention, the coupling means comprises at least one joint. The joint interconnects the two support portions, it being possible for said jointed connection to be formed in varying manners; in particular a film hinge can also be used.

BRIEF DESCRIPTION OF THE DRAWINGS

The invention will be explained in greater detail in the following with reference to FIGS. 1-6:

FIG. 1 is a schematic cross-sectional view through the support portions in a first embodiment according to the invention, in a first position comprising emptied hollow bodies.

FIG. 2 shows the first embodiment according to the invention in a second position, comprising partially filled hollow bodies.

FIG. 3 shows the first embodiment according to the invention in a third position, comprising heavily or completely filled hollow bodies.

FIG. 4 is a schematic cross-sectional view through the support portions in a second embodiment according to the invention in a first position, comprising emptied hollow bodies.

FIG. 5 shows the second embodiment according to the invention in a second position, comprising partially filled hollow bodies.

FIG. 6 shows the second embodiment according to the invention in a third position, comprising heavily or completely filled hollow bodies.

FIGS. 7A to 7C show a first variant of the embodiment shown in FIGS. 1-3.

FIGS. 8A to 8C show a second variant of the embodiment shown in FIGS. 1-3.

FIGS. 10A to 10C show a fourth variant of the embodiment shown in FIG. 1-3.

FIGS. 11A to 11C show a fifth variant of the embodiment shown in FIGS. 1-3.

DETAILED DESCRIPTION OF PREFERRED EMBODIMENTS

Figure 9A:
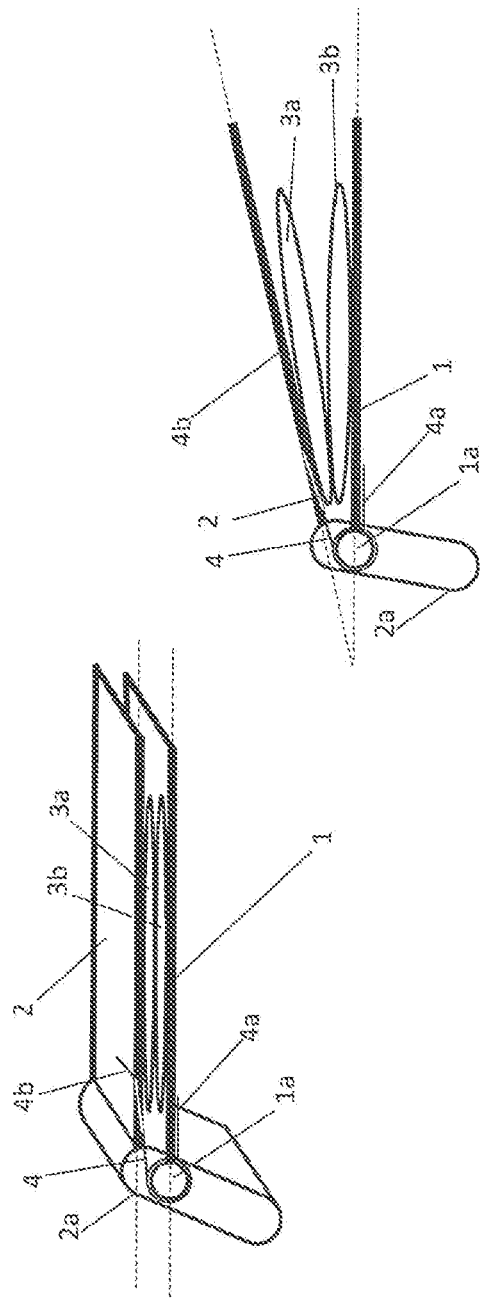
FIGS. 9A to 9C show a third variant of the embodiment shown in FIG. 1-3.
Figure 9B:
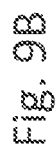
Figure 9C:
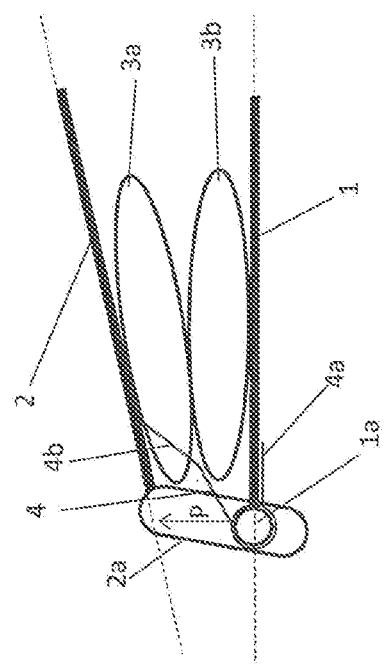

In the first embodiment shown in FIGS. 1-3, the two support portions 1 and 2 are merely indicated schematically in this case, in the form of a planar arrangement, such as a plate. The form can, however, be selected as desired. At least one hollow body that can be filled with fluid, in this case in the form of a balloon 3a and 3b, is arranged between the two support portions 1 and 2. Even if, in all the following drawings, two balloons 3a and 3b are always shown, it is to be understood that it is of course also possible for more or fewer balloons or hollow bodies that can be filled with fluid to be arranged between the two support portions 1 and 2. If reference is made, above and in the following, to fluid, this preferably means air, but it is of course also possible for other gases and/or liquids to be used as the fluid for filling the hollow body 3a and/or 3b.

The first support portion 2 comprises a guide 2a, the second support portion 1 is connected to a guide portion 1a. The guide portion 1a can for example be a peg or pin or a rod. The guide 2a itself can interact in different ways with the guide portion 1a. The preferred embodiment is that the guide 2a comprises a preferably linear slide guide or guide groove. Preferably, one of the two support portions 1 or 2 is arranged so as to be more or less immovable in terms of location, for example fastened to the structure of the vehicle seat or motor vehicle seat (not shown). In order to implement the inventive concept, it is sufficient for the two support portions 1 and 2 to be moved relative to one another.

In the example of FIG. 1, the hollow body 3a or 3b is not, or is only slightly, filled with fluid, such that the two support portions 1 and 2 are arranged so as to be more or less in parallel with one another. The respective relative positions of the two support portions 1 and 2, with respect to one another, are further indicated by the dashed lines. In the example shown, the guide 2a is arranged at an angle to the dashed line or to the relevant support portion 2, specifically such that the orientation of the guide 2a with that of the side of the support portion 2 facing the balloon or the hollow body 3a or 3b forms an obtuse angle. In the example shown, the guide portion 1a is guided in or on the guide 2a.

If a hollow body 3a or 3b is filled with fluid, then the arrangement passes through the representation shown in FIG. 2. In this case, firstly the two support portions 1 and 2 are pivoted relative to one another, as indicated by the dashed lines angled towards one another. A relative rotation of the two support portions 1 and 2 thus takes place.

Upon further filling, the hollow body 3a or 3b performs a lift in the arrow direction P, which results in the two support portions 1 and 2 being pushed apart. In order to allow for this pushing apart, the guide 2a migrates, relative to the guide portion 1a, in the direction of the arrow P, as indicated in FIG. 3. Thus, in the embodiment shown in FIGS. 1-3, the two support portions 1 and 2 firstly perform a rotational movement relative to one another, and subsequently a translational movement.

In the embodiment illustrated in FIGS. 4-6, this rotation-translation sequence is reversed.

As shown in FIG. 4, in this case the guide 2a is arranged, in terms of the orientation thereof, at an acute angle relative to the inner surface of the support portion 2, facing the hollow body 3a.

If, as shown in FIG. 5, the hollow body 3a or 3b is filled, firstly a lift is performed, i.e., the two support portions 1 and 2 are displaced in translation, relative to one another, the guide portion 1a migrates along, in the guide 2a, in the direction of the arrow P.

Upon further filling of the hollow body 3a or 3b, the guide portion 1a finally comes into contact with the lower edge of the guide 2a and strikes there. This results in a further translational relative movement of the two support portions 1 and 2 no longer being possible. Therefore, as indicated by the dashed lines, a rotation about the hinge pin is defined by the guide portion 1a. Consequently, in this embodiment, firstly a translational, and subsequently a rotational, relative movement of the two support portions 1 and 2 takes place.

It is left to the discretion of a person skilled in the art as to which of the two variants shown is preferred.

When designed as a rod, the guide element 1a can also be implemented such that one or more concentric holes are provided in the region of the support portion 1, through which holes a rod of this kind can then be pushed.

The above drawings do not show that the two support portions 1 and 2 can also be preloaded against one another, counter to the lifting movement of the filled hollow bodies 3a and 3b, using a tensioning element or return element, in order to again reach the starting position shown in FIGS. 1 and 4 when the hollow bodies 3a and 3b are emptied.

A return element of this kind can be a commercially available spring. It is also possible to use the cushioning (not shown here for reasons of clarity), for example the foam used therein, as a return element or return means. Examples for return elements can be found in FIGS. 7A to 11C. These are shown using the example of the embodiment according to FIGS. 1-3. In a corresponding manner the variants shown in FIGS. 7A to 11C can, however, also be applied to the embodiment shown in FIGS. 4-6.

In the variant shown in FIGS. 7A to 7C, a compression spring 4 acts, as a return element, between a first coupling portion 5 arranged on the guide portion 2a, and the guided portion. If, proceeding from FIG. 7A, one of the hollow bodies 3a, 3b is filled, then the spring constant of the compression spring 4 is kept such that firstly a rotation of the two support portions 1, 2 with respect to one another takes place (FIG. 7B). Upon further filling of the hollow bodies 3a, 3b, the compressive force achieved thereby is sufficient for pushing the two support portions 1, 2 away from one another (FIG. 7C), as a result of which the compression spring 4 is pressed by the guided portion 1a against the coupling portion 5, and compressed in the process. As a result, a preload is built up in the direction of the arrow P, which ensures, upon emptying of one of the hollow bodies 3a or 3b, that the two support portions 1, 2 are moved towards one another again.

The variant just described can also be implemented by means of a tension spring, as is shown in FIGS. 8A to 8C. In a manner differing from the example just described, in this case the tension spring 4 is, as the return element, arranged between or fastened to a first coupling portion 5 again arranged on the guide portion 2a, and a second coupling portion 6 that is arranged on the guided portion 1a. The remaining kinematics proceeds just as in FIG. 7A to 7C. Here, too, on account of the corresponding spring constant of the tension spring 4, the two support portions 1, 2 are firstly crossed relative to one another, before the tension spring is subsequently spread apart (FIG. 8C) and a return force builds up in the direction of the arrow P.

FIGS. 9A to 9C, and 10A to 10C, show two embodiments, in which the return element 4 is designed as a torsion spring, in the example shown as a leg spring comprising a first leg 4a and a second leg 4b.

In FIG. 9A the first leg 4a rests on the support portion 1, while the other leg 4b is supported on the support portion 2. The legs 4a, 4b can either be rigidly connected to the respective support portions 1, 2, or, at least in the example shown, can rest on the relevant outer face, i.e., the sides of the support portion 1, 2 remote from the hollow bodies 3a and 3b, respectively. The leg spring 4 is guided around the guided portion 1a. Here, too, the spring constant of the leg spring 4 is again selected such that filling the hollow bodies 3a and 3b, respectively, firstly results in a mutual crossing of the two support portions 1, 2 relative to one another, the legs 4a and 4b in this case firstly being slightly spread apart. In the further progression, upon continuing spreading of the legs 4a and 4b, the two support portions 1, 2 are then also displaced relative to one another again, and a restoring force is again built up in the leg spring 4, which force acts in the direction of the arrow P and results, upon emptying of the hollow bodies 3a and 3b, respectively, in the two support portions 1, 2 approaching one another again.

The arrangement of the leg springs shown in FIGS. 10A to 10C also functions in a similar manner. In turn, one leg 4a of the leg spring is attached to the support portion 1 or is supported thereon. The leg spring guided around the guided portion 1a is furthermore also supported on or fastened to the guide portion 2a. Filling the hollow bodies 3a and 3b causes the two legs 4a and 4b, respectively, to be moved towards one another (FIG. 10B, FIG. 10C), then, following initial crossing of the two support portions 1, 2 with respect to one another, a shifting of said portions 1, 2 also taking place again, and the restoring force being built up in the leg spring 4, in the direction of the arrow P, by pushing apart the two legs 4a and 4b, which force leads, upon emptying of the hollow bodies 3a and 3b, to the guided portion being pushed, in the guide portion, in the direction of the arrow P.

The embodiment shown in FIGS. 11A to 11C uses a tension spring 4 as a return element. Unlike in the preceding embodiments, said tension spring 4 is not arranged in the vicinity of the guide portion 2a or the guided portion 1a, but rather on the end portions of the support portion 1, 2 that are opposite said two portions 1a and 2a, respectively. If, proceeding from the situation shown in FIG. 11A, the hollow bodies 3a and 3b are filled, the spring constant of the tension spring 4 is such that firstly crossing of the two support portions 1, 2 also occurs again, although this time not about a swivel pin in the region of the guide portion 2a or of the guided portion 1a, but rather in the region of the spring 4. As a result, the guided portion 1a is also moved in the guide portion 2a, downwards in the drawing (FIG. 11B). The spring 4 is spread apart only when the lift of the two hollow bodies 3a and 3b has become so great that the guided portion 1a can migrate no further in the guided portion 2a, but rather has reached an end stop. Thus, in this position, the two support portions 1 and 2 are then moved away from one another or even pivoted about a shaft, the spring 4 then being spread apart and the return force building up.

What is claimed is:

1. A vehicle seat comprising a backrest, a seat part, as a return means (4), and at least one sidewall arranged on the backrest or on the seat part, the sidewall comprising two support portions (1, 2) that are coupled together, by a coupling means (1a, 2a), and are movable relative to one another, between which support portions at least one hollow body (3a, 3b) that can be filled with fluid is arranged, the relative position of the two support portions (1, 2) with respect to one another, and thus the outside contour of the sidewall, being variable by filling or emptying the at least one hollow body (3a, 3b), wherein the coupling means (1a, 2a) is designed such that, upon filling or emptying of the at least one hollow body (3a, 3b), the two support portions (1, 2) are variable relative to one another, both in translation and in their angular position, wherein the return means (4) is active between the two support portions (1, 2), which return means (4) is tensioned upon filling of the at least one hollow body (3a, 3b), and the return means (4) is a torsion spring in the form of a leg spring that is guided around the guided portion (1b) and comprises a first leg (4a) and a second leg (4b), the first leg (4a) resting on the second support portion (1), on the side remote from the hollow body (3a, 3b) that can be filled with fluid, and the second leg (4b) being supported on the first support portion (2), on the side remote from the hollow body (3a, 3b) that can be filled with fluid, or on the guide portion (2a).

2. The vehicle seat according to claim 1, wherein the support portions (1, 2) comprise plate-like contact portions, on which the at least one hollow body (3a, 3b) is supported.

3. The vehicle seat according to claim 1, further comprising a guide portion (2a) is arranged on a first support portion (2), and a portion (1 a) guided by the guide portion (2a) is arranged on another, second support portion (1).

4. The vehicle seat according to claim 3, wherein the guided portion (1a) comprises a guide pin or a guide rod, and the guide portion comprises a guide groove or guide slide or guide receptacle, on or in which the guided portion is received.

5. The vehicle seat according to claim 3, wherein the guide portion (2a) comprises a linear guide and/or an arcuate guide and/or a curved guide deviating from a linear course.

6. The vehicle seat according to claim 1, wherein the hollow body or bodies (3a, 3b) that can be filled with fluid is/are (a) pneumatically actuated balloon(s).

7. The vehicle seat according to claim 1, wherein the first or the second support portion (2, 1) is arranged so as to be stationary with respect to the motor vehicle seat.

8. The vehicle seat according to claim 1, wherein the coupling means (1 a, 2a) comprises at least one joint.

* * * * *